United States Patent [19]

Melas et al.

[11] 4,417,245

[45] Nov. 22, 1983

[54] DIGITAL SPACE DIVISION EXCHANGE

[75] Inventors: Constantin M. Melas, Los Gatos, Calif.; Michael A. Patten, Cary, N.C.

[73] Assignee: International Business Machines Corp., Armonk, N.Y.

[21] Appl. No.: 298,705

[22] Filed: Sep. 2, 1981

[51] Int. Cl.³ .......................... H04Q 9/00; H04Q 3/00
[52] U.S. Cl. ............................. 340/825.8; 340/825.91; 370/64; 179/18 GF; 179/18 EA
[58] Field of Search ........... 340/825.8, 825.83, 825.91, 340/825.79; 370/16, 59, 64; 179/18 GF, 18 EA

[56] References Cited

U.S. PATENT DOCUMENTS

| | | | |
|---|---|---|---|
| 3,865,979 | 2/1975 | Hestad | 340/825.8 |
| 3,928,730 | 12/1975 | Aagaard et al. | 340/825.8 |
| 4,293,735 | 10/1981 | Duret | 340/825.79 |
| 4,307,379 | 12/1981 | Wyland | 340/825.3 |
| 4,320,501 | 3/1982 | Le Dieu et al. | 370/64 |

Primary Examiner—Donald J. Yusko
Attorney, Agent, or Firm—Gerald R. Woods; Joscelyn G. Cockburn

[57] ABSTRACT

A switching network is comprised of a plurality of identical chips and a network (control) processor. Each of the chips is a novel intelligent switch and includes both a cross point array as well as apparatus to control the cross point array in response to a set of multi bit commands or to formulate a response to a query concerning status of the switching array. The number of command lines connecting network (control) processor to each of the array chips may be as few as two. The cross point array includes a cross point device (switch) for each inlet-outlet combination. The total number of cross points in the network is lower than that dictated by a CLOS network.

9 Claims, 5 Drawing Figures

DIGITAL SPACE DIVISION EXCHANGE

DESCRIPTION

1. Technical Field

The invention relates to the field of digital switching. More particularly, it relates to a device for selectively interconnecting a plurality of digital devices.

2. Background Art

The rapid growth of the telephone system is due, in no small part, to the free accessibility or interconnectivity between a called telephone (output port) from a calling telephone (input port). The ready accessibility referred to above is due almost entirely to the automatic analog and digital switching networks found in today's telephone system.

In the case of digital systems, it has been known for some time that the function and reliability of a system depends on more than the function and reliability of its components; accessibility of these components is also an important characteristic. Traditionally the terminals, controllers, computers, etc. in a digital or data processing system have been switched either under manual control or under software control. Both these techniques are relatively slow and inefficient. Most digital networks are now composed of high speed dedicated communication links and low speed switchable or multi-use links. As applications and systems have evolved, three trends in data communication have increased the need for a transparent, high speed switch for all lines. Those trends are (1) larger system configurations, (2) intersystem communications and (3) multisystem access for end users. In addition, for easy system reconfigurability and improved availability, the need for such a digital switch has been further accentuated in order to connect, in large systems, I/O devices and control units to not one or two, but several main processor channels.

Prior art solutions to these problems initially placed a simple manual switch at a single terminal to allow connection between that terminal and several control units (ports) each dedicated to a different application. In those cases where it is not practical to provide physically separate lines or communication links for all possible communication paths, it is often necessary to route a message or data through an intermediate unit or system to its destination. This "store and forward" handling of data requires additional software and delays response time.

In some cases, the manual switch referred to above is removed from the terminal and located in the vicinity of the computer, but this only partially solves the problem. The advantage is that only one line is required from the terminal to the switch, but the number of dedicated control unit ports remains unchanged.

Another prior art solution is exemplified by Moran, U.S. Pat. No. 4,328,893 for a "Reconfigurable Data Bus;" see also "A Hybrid Communications Switching System" by Moran et al appearing in the *Proceedings, Electronics Components Conference,* 1975, pages 30–36 (IEEE, 1975).

In our view, however, the best solution is a switching arrangement that allows any terminal to be connected to any port, whether local or remote. This gives access to all lines or communication links without having to duplicate lines, allowing a user to configure and re-configure a system to provide maximum service with a minimum number of lines (or communication links) and less supporting equipment.

Prior art digital switching systems which are directed at a similar end are exemplified by, for example, Ekberg et al, U.S. Pat. No. 3,566,041; Reines et al, U.S. Pat. No. 3,962,552; Hwang, U.S. Pat. No. 4,038,638 and Lawrence et al, U.S. Pat. No. 4,201,890.

One known switching arrangement (for either digital or analog signals) is an array of cross point switches. For example, there may be a single cross point switch to connect every inlet line to every outlet line. To serve 1024 inlets and outlets, this array requires in excess of 1 million cross point switches; while this is the simplest switching arrangement, it is also the most costly.

The prior art also teaches that the number of cross points in such an array can be reduced by requiring the switching action to occur accross several stages. For example, a 3-stage CLOS network includes primary, intermediate and tertiary stages. The primary includes n inlets and $2n-1$ outlets. The tertiary stage has n outlets and $2n-1$ inlets. the intermediate stage has $2n-1$ switches with $2n-1$ inlets and outlets. In a CLOS network, for serving the same 1024 inlets and outlets the number of cross point switches is reduced to something under 200,000 or a reduction of over 5:1.

We have found that a further reduction in the number of cross-points can be had without significant detriment by using square arrays ($n \times n$) rather than the CLOS dictated arrays of $n \times 2n - 1$. Our 3-stage network does, however, have a disadvantage not found in the simple but costly large matrix or the CLOS network. In either of these, every inlet can be connected to any outlet, regardless of the existing state of the network. Our 3-stage network, however, is blocking in that for specific configurations of the network it may not be possible to connect a particular inlet to a particular outlet. This is for the reason that each such connection requires a primary to intermediate link as well as an intermediate to tertiary link, and an intermediate with a free link to the desired primary may not have a free link to the desired tertiary. This problem can be overcome in accordance with the invention described in Melas copending application Ser. No. 298,398, filed Sept. 1, 1981, (RA979-011) and assigned to the assignee of this application. That application describes a method for rearranging connections in a multi-stage network so that an otherwise blocking multi-stage network can appear, at its input and output ports, and as a nonblocking network. The advantage is that our network requires something less than 100,000 cross points to serve 1024 inlets and outlets. Even more dramatic simplification is evidenced for a network of $2048 \times 2048$ inlets and outlets. The brute force approach requires over 4 million cross points, the CLOS network is somewhat simpler but our network requires 262,144 cross points. It should be understood that the network need not be square (equal number of inlets and outlets) and the $1024 \times 1024$ and $2048 \times 2048$ are mentioned merely to illustrate the advantages of the invention.

The use of solid state techniques allows the cross point arrays, used in a multi-stage switching network, to be considerably reduced in physical size; for example for the exemplary 1024 inlet, 1024 outlet switching network, the switches in each stage can be grouped into cross point arrays of 32 inlet $\times$ 32 outlet capacity ($32 \times 32$ is merely a convenient size). Each such array can be implemented on a single solid state chip. However, even such a $32 \times 32$ cross point array has 1024 switches which must be capable of being individually controlled. Postulating a 32×32 cross point array requires 32 separate inlet terminals and 32 separate outlet terminals; the requirement for 1024 individual control signals, one to control each of the 1024 cross point switches could, in the extreme, require 1088 separate input terminals; this is far beyond the capacity of a convenient size chip. It is not unusual, in solid state technology for the functions performed on a chip to be limited by required pin count rather than chip area. As indicated above, a requirement for as many as 1088 terminals is just such a limitation.

Although there are other schemes which could be used to reduce pin count, this factor remains as the limiting condition. It is therefore one object of the present invention to provide a cross point array which can be implemented on a conveniently sized chip and which does not impose insuperable burdens on pin count.

Typical prior art switching arrangements located all or substantially all of the intelligence in the switch in a central controller. The central controller included sufficient random access memory to provide a "map" representing the condition of each switch in the network. Using this "map", the centralized controller could determine the actions necessary to make a connection between inlet and outlet terminals (for example which switches must be closed, etc.), to break a connection (i.e. which switches must be opened) to determine whether or not a connection or path is available or is blocked, etc. One difficulty with this arrangement is the possibility (notwithstanding efforts usually made to prevent this condition) of the memory "map" falling out of coincidence with the actual switch conditions. Accordingly, prior art switches included recovery techniques in the event such an out of correspondence condition was detected. Usually the recovery technique required altering the stage of the switch to some predetermined condition (usually all switches open), and then reconnecting the desired paths. An obvious difficulty with this approach is that it requires breaking those connections that are made at the time the recovery procedure is initiated. Accordingly, it is another object of the present invention to provide a multi-stage switching network which does not require a memory "map" of the switch condition and which therefore does not admit the possibility of a out of coincidence condition between the switch configuration and the memory "map". This is achieved by providing an interrogation feature allowing the state of any selected cross-point to be reported.

Furthermore, as described in several of the referred to references as well as in the copending application, certain advantages flow from providing the array with switches in excess of that necessary to handle the desired number of inlets and outlets, which additional switches can be used to provide alternate temporary paths, for call rearranging purposes.

In accordance with the foregoing therefore, the invention provides solutions to the problems described above as well as considerably simplifying the topography, packaging and functions of a multi-stage switching network. This is effected by first providing the cross point switching function in the form of intelligent cross point arrays. As a consequence of providing such intelligent cross point arrays, the connections necessary to provide control information from the network control to an individual array has been reduced down to that requiring only a few separate conductors. Actually two such conductors are all that is necessary. For example, one of the two separate conductors can provide control information in the form of sequential signals which, in the control portion of the intelligent cross point array, are deserialized to represent a command. The same conductor can be used to carry other sequential signals requiring the cross point array to respond with information respecting the condition of selected switches in the array. By allowing the network control to interrogate an array for the condition of a specific cross-point, we can eliminate the necessity for the switch "map" referred to earlier. The same conductor can also be used, with a different set of commands, to cause the conductor to be connected to either a selected inlet or a selected outlet. Finally, a second conductor is employed to command a disconnect of the first conductor from an inlet or outlet conductor to which it had previously been connected. In an embodiment of the invention which had been constructed we actually used three rather than two conductors. Even three conductors is a significant simplification of prior art devices.

Accordingly, in one aspect the invention provides:
a switching network comprising:
a plurality of intelligent cross point arrays, each with plural input and plural output conductors, for selectively connecting input and output conductors in response to externally generated commands,
network control means for generating said external commands and for monitoring the status of said arrays,
wherein the improvement comprises coupling means for coupling network control means to said intelligent arrays, said coupling means consisting of no more than three conductors for each of said arrays.

A more particular aspect of the invention provides within each of the intelligent cross point arrays:
a plurality of controlled switches for coupling each of said input lines to each of said output lines,
a plurality of switch controllers, one for each of said switches,
control means for selectively controlling each of said switch controllers in response to externally generated commands, the control means including:
first means for responding to sequential signals on a one of said conductors to control said plurality of switch controllers,
second means to selectively connect said one of said conductors to one of said inlets or outlets in response to one of a selected set of sequential signals on said one of said conductors, and
third means responsive to a signal on the other of said pair of conductors for breaking a connection previously established by said second means.

As mentioned above, the intelligent cross point array includes apparatus to sense the condition of any of the switches in the associated array and to formulate and return a message on one of the three (or two) conductors indicating the status of that switch. Accordingly, in accordance with this aspect, the invention provides in addition to first, second and third means in said control means, fourth means responsive to sequential signals on one said conductor to sense the status of any of said switches, and including message generating means to assemble and transmit on one of said conductors sequential signals reflecting said status.

In accordance with a further aspect, the invention provides a switching network for connecting any of a plurality of up to N input lines to any of a plurality of up to N output lines comprising:

a plurality of n×n intelligent cross point arrays connected in 3 groups, a first group of A arrays connected to said N input lines, where A=N/n, a second group of A arrays with inputs connected to outputs of arrays in said first group, a third group of A arrays with inputs connected to outputs of arrays in said second group and outputs connected to said N output lines, network control means coupled to each of said arrays for selectively controlling switches in said arrays to connect selected input and output lines, and means connecting said network control means to each of said arrays.

BRIEF DESCRIPTION OF THE DRAWINGS

The invention will now be further described to enable those skilled in the art to make and use the same, in the following portions of this specification when taken in conjunction with the attached drawings in which like reference characters identify identical apparatus and in which.

DESCRIPTION OF PREFERRED EMBODIMENTS

Figure 1:
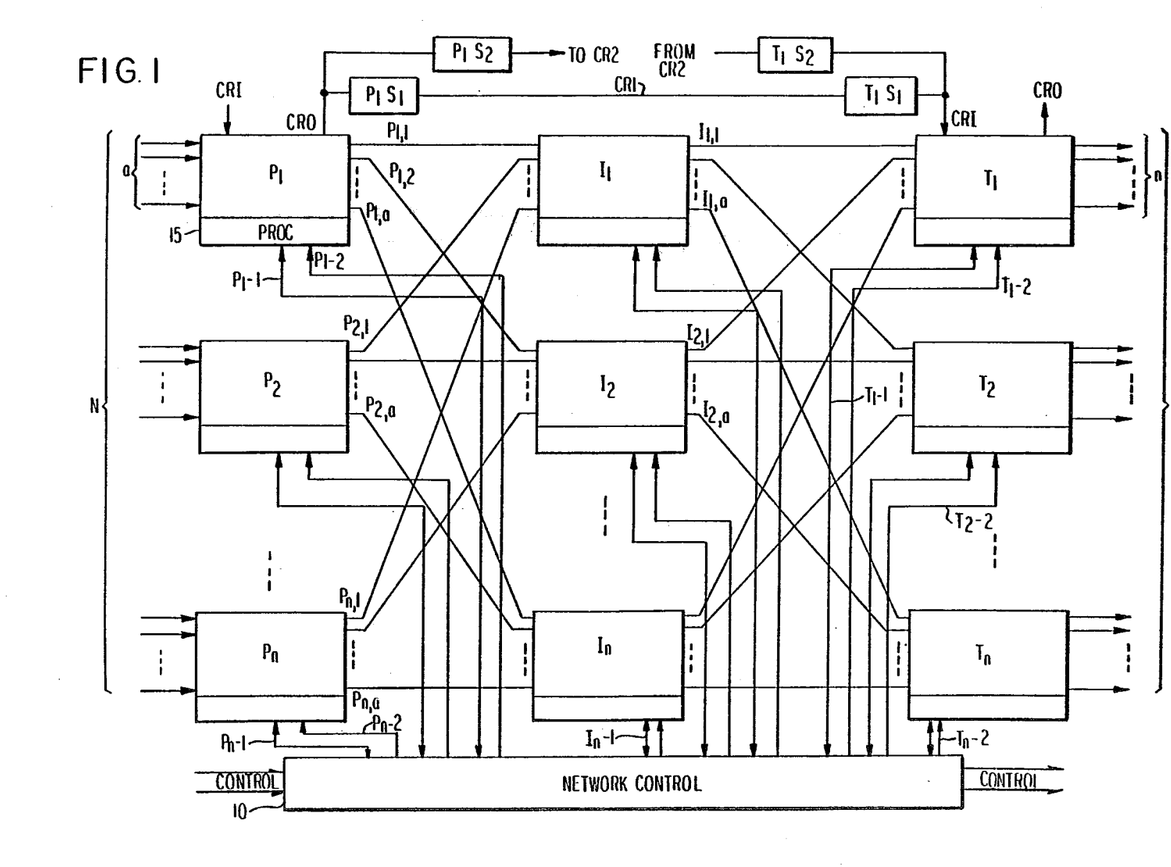
FIG. 1 is a block diagram of the switching network comprising a plurality of intelligent cross point arrays and a network control.

FIG. 1 is a block diagram of a switching network in accordance with the present invention. The switching network includes a plurality of intelligent cross point arrays $P_1-P_n$, $I_1-I_n$ and $T_1-T_n$. The intelligent cross point arrays are arranged in a typical CLOS arrangement comprising primary (P), intermediate (I) and tertiary (T) stages. Each stage includes a plurality of arrays. In contrast to the CLOS arrangement, however, we use square arrays, with an equal number of arrays in each stage. In addition to the plurality of intelligent cross point arrays, the switching network also includes a network control 10. In an embodiment of the invention which has been constructed, network control 10 comprised a Z80 microprocessor; those skilled in the art can readily substitute other microprocessors, or other stored program processors to perform the function of network control 10.

The function of the switching network shown in FIG. 1 is to connect selected input lines (shown at the left) to selected output lines (shown at the right). Although the switching network shown in FIG. 1 has N input and output lines, those skilled in the art will be aware that there is no reason why the number of input and output lines need be equal. Each of the primary stage intelligent arrays is coupled to a of the N input lines. Since each of P, I and T arrays has an equal number of inlets and outlets, each array also includes a outlet lines; these are identified in FIG. 1 as $A_{x,y}$; where A can be P, I or T identifying primary, intermediate and tertiary stages respectively, x can be any integer from 1 to n (to identify the rank of the array in the stage) and y can be any integer from 1 to a (identifying the rank of the outlet line). Each outlet of each stage (except T) is coupled to the inlet of the next succeeding stage and the rank of the outlet identifies the rank of the array to which it is connected. The rank of the array from which an outlet is derived, identifies the rank of the inlet in the array to which it is connected. Thus, $P_{1,1}$ comprising the first outlet of the first array in the primary stage is connected to the first inlet of the first ranked array in the intermediate stage. $P_{1,2}$ is connected to the second intermediate stage array, at its first inlet, and so on. The same pattern is employed in connecting intermediate stage outlets to tertiary stage inlets.

A novel characteristic of the switching network shown in FIG. 1 is the interconnection between each of the arrays and the network control 10. More particularly, and as shown in FIG. 1, each array includes a processor 15 which is coupled to the network control 10 via a pair of conductors only, a first bidirectional conductor 1 and a second unidirectional conductor 2. (The control conductors in FIG. 1 are also identified by the stage and rank of the array to which they are connected, hence the conductor 1 connected to $P_1$ is identified as $P_1-1$.) To enable the switching network to function, the processor 15, in each of the intelligent cross point arrays is capable of executing any of eight different commands which are received in sequential or serial format over the conductor 1. These eight commands are:

1. Determine the status for a selected cross point (the cross point at the intersection of a selected inlet and outlet).

2. Connect a selected inlet to a selected outlet.

3. Disconnect a selected inlet from all outlets.

4. Connect a selected inlet to a special call rearranging outlet.

5. Connect a special call rearranging inlet to a selected outlet.

6. Disconnect a call rearranging connection.

7. Connect a selected inlet to the bidirectional conductor 1.

8. Connect the bidirectional conductor 1 to a selected outlet.

In respect of the last two commands, connection of the bidirectional conductor 1 to either a selected inlet or outlet causes the bidirectional conductor 1 to change its function from a command to a data line. In order to terminate this mode of operation, a command to that effect is transmitted on the second unidirectional conductor 2. When received, this has the effect of terminating the status achieved by execution of either of the commands 7 or 8.

Commands 2 through 8, when executed, change the status of a particular cross point switch or switches; the first command is different in that it determines the status of a particular cross point switch. This command therefore requires that a response be communicated back to the network control 10. The processor 15, after determining the status in response to this command, formulates a reply message which is then transmitted serially or time sequentially over the bidirectional conductor 1 back to the network control 10.

The switching network includes at least two call rearranging buses (FIG. 1 shows one of these CR1). These buses provide for a temporary parallel path which can be used during call rearranging. Each array has a call rearranging inlet (CRI) and outlet (CRO). These inlets and outlets are shown for $P_1$ and $T_1$ only, but it should be understood that all of the arrays have similar terminals. For connecting inlets, at the left, to outlets, at the right, primaries $P_1-P_n$ have CRO's connected to CR1 and CR2; their CRI's are not connected. Similarly $T_1-T_n$ has their CRI's connected to CR1 and CR2; their CRO's are not used. The manner of connecting CR1 and CR2 to the respective CRI and CRO terminals shown in FIG. 1 is a convenient technique which has been used in an embodiment of the invention but which is not essential. Briefly, the CRO of any primary is connected to inputs of switches $P_nS_1$ and $P_nS_2$ (where n indicates the primary rank and the S subscript identifies the CR rank, 1 or 2). To complete a call rearranging connection one of $P_nS_1$ or $P_nS_2$ is closed. Similar remarks apply to the switches $T_nS_1$ or $T_nS_2$ connected to tertiary CRI's. The switches external to the arrays also provide for isolating unconnected arrays from the CR buses.

Figure 2:
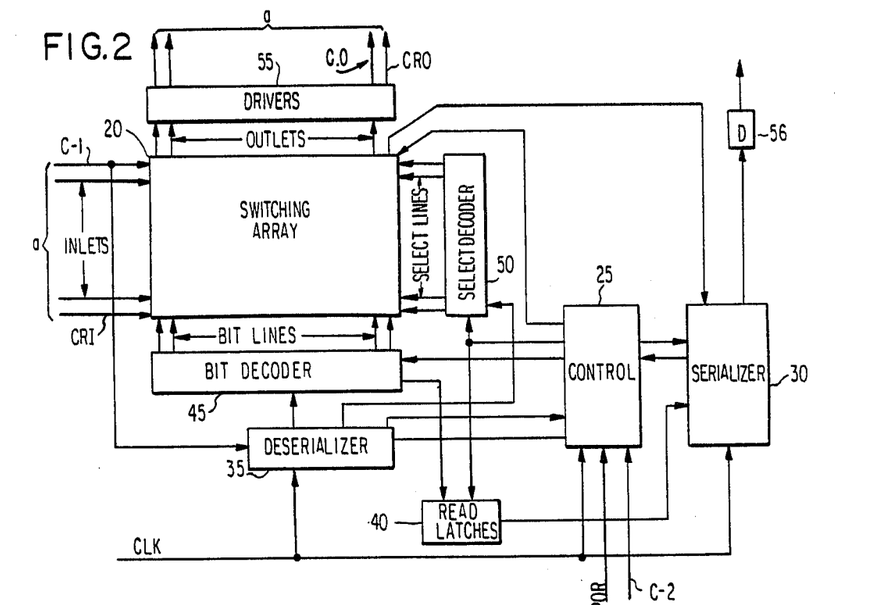
FIG. 2 is a block diagram of the intelligent cross point arrays.

FIG. 2 is a block diagram of a typical intelligent cross point array. Major components of the intelligent cross point array include the switching array 20; the remaining apparatus (aside from drivers 55 and 56) in FIG. 2 comprises the processor 15. This apparatus includes a control unit 25, a serializer 30, a deserializer 35, read latches 40, a bit decoder 45 and a select decoder 50. The inputs to the switching array include the a data inlets comprising either the input to the switching network or outlets of a preceding stage, an additional inlet C-1 derived from the bidirectional conductor 1, as well as a call rearranging input CRI. The switching array provides outlets to drive the drivers 55 which in turn provide the a outlets comprising the output of the switching network or inputs of succeeding stages, and in addition, a call rearranging output CRO, and an additional output C-O connection to the bidirectional conductor 1. The same conductor is coupled as the input to the deserializer 35. Different stages of the deserializer 35 provide an inlet addressing input to the select decoder 50, an outlet addressing input to the bit decoder 45, as well as operation code input to the control unit 25. Other inputs to the control unit 25 comprise the unidirectional conductor 2 (shown as C-2, FIG. 2) from the network control 10, a power on reset (POR), and a clocking input. The control unit 25 responds to operation codes received from the deserializer 35 and can perform a number of functions: it can reset the deserializer 35, provides timing pulses to the bit decoder 45 and the select decoder 50, provides a start signal for the serializer 30 and provides control signals to the switching array 20 for selected cross points. The serializer 30, when initiated, obtains status information from the read latches 40, serializes that information, after receiving a start signal from the control unit 25, provides a serialized output to the driver 56, whose output is connected to the bidirectional conductor 1. The serializer can also receive data mode status and command error status from the control unit 25 and outputs the same as above. When the serializer has serialized the required information, it provides a complete signal to the control unit 25. Bit decoder 45 selects a particular column of switches in the switching array 20 and select decoder 50 selects a particular row of switches in the array, the intersection of the selected row and column identifying a selected cross point switch.

Figure 3:
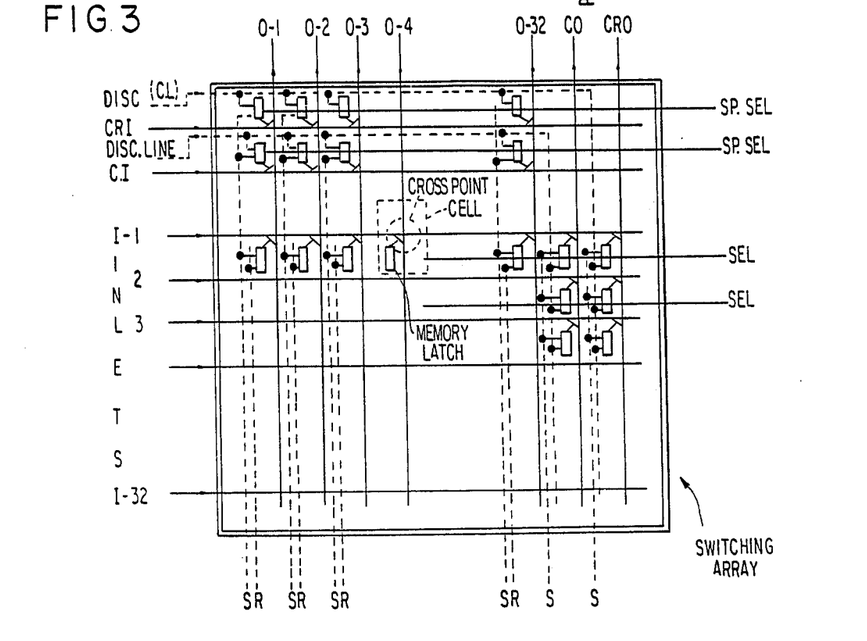
FIG. 3 is a schematic of the array itself.

The array 20 is shown in detail in FIG. 3. The array 20 consists of a switching matrix of inlet and outlet lines superimposed on an addressable, static random access memory array. The memory array includes at least a one bit memory capacity for each intersection of an inlet and outlet line. Accordingly, there is a one for one correspondence between memory array locations and switches in the switch matrix. These associated memory array locations and switch array locations are connected so that the condition of the memory array controls the associated switching array device. More particularly, each intersection of an inlet and an outlet line is associated with a cross point device which, when closed, connects the inlet to outlet, and when open disconnects the inlet from the outlet. Associated with each cross point device is a memory latch, the condition of the latch controls the state of the cross point device. The combination of the cross point device and the memory latch is called a cell. Using this terminology then, there is a cell for each intersection of inlet and outlet lines. In addition to the inlet and outlet line associated with each cell, there are in addition a select input and a set, or a set and reset input. By using a conventional half select addressing scheme, a row of cells has a select line in common, and similarly a column of cells has set or set and reset lines in common.

The array includes a row for each inlet line I-1 through I-32, and a column for each oulet line O-1 through O-32. In addition, so-called special, additional rows and columns are provided. One such additional row is connected to the bidirectional conductor 1 and labelled CI (for control inlet) in FIG. 3. A second such special row is provided for a call rearranging inlet (labelled CRI). Correspondingly, an additional column is used as a control output line (CO connecting the switching array 20 to the serializer 30 in FIG. 2) which is coupled via the serializer 30 and driver 56 to the same bidirectional conductor 1. A further additional column is provided for a call rearranging outlet, and labelled CRO in FIG. 3. However, there are no cells provided at the intersection of the additional rows and columns; note that the control inlet (CI) cannot be connected to either the call rearranging outlet or the control outlet (CRO and CO, respectively) nor can the call rearranging inlet (CRI) be connected to either the call rearranging outlet or the control outlet. However, any of the inlets I-1 through I-32 can be connected to either the control outlet or the call rearranging outlet, and in addition, any of the control inlet or call rearranging inlet can be connected to any of the outlets O-1 through O-32 through the provision of the cell associated with the appropriate cross point.

Connecting, disconnecting and reading the status of cross points is effected via the use of the eight different commands. Connection commands connect a specific inlet to a specific outlet; any of the inlet lines I-1 through I-32 can be connected to any one or more than one of the outlet lines, although since the connection command is specific, a different command is required for each connection. Cells associated with inlet lines I-1 through I-32 include both set and reset lines as well as a select line. Selecting and setting the memory latch associated in a specific row and column turns on the latch and makes the connection; this condition is retained until a specific command is executed to disconnect. The disconnect command is effected by the select line and therefore every cell associated with an inlet line I-1 through I-32 is reset by a single command.

Figure 4:
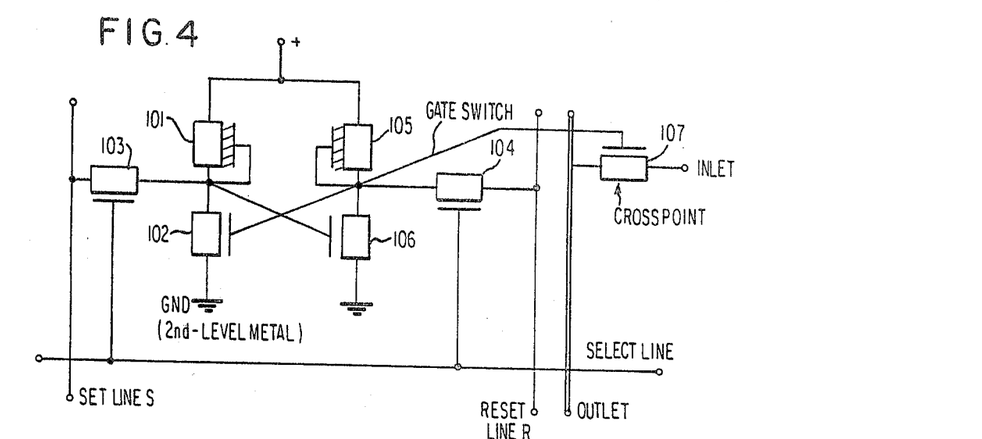
FIG. 4 is a schematic of a typical cell of the array.

Before discussing the manner in which the condition of a cell can be interrogated, reference is made to FIG. 4 which is a representation of the memory latch and cross point device constituting the cell. As shown in FIG. 4, the memory latch comprises FET's 101-106, and the cross point device comprises a controlled FET 107. The set line S of a cell is gated to the set side FET's 101 and 102 via the FET 103. In a similar fashion, the reset line R is gated to the reset side of the latch 105, 106 by the FET 104. The condition of the latch is coupled to the gate of FET 107. With the latch in one state (set) FET 107 is closed, connecting inlet to outlet, in the other condition (reset) of the latch, the FET 107 is disabled, disconnecting its inlet from the outlet. In operation, the cell is operated by charging both the S (set) and R (reset) lines and discharging one of them depending on whether a connection or disconnection is to be effected. When lines S and R are charged, and one of them is not discharged, the latch itself will discharge one of the lines depending on its condition. If the latch had been set, the set line will be discharged, if the latch had been reset then the reset line will be discharged. This enables the condition of the latch to be read. The read command actually determines two pieces of information, the state of the given inlet and outlet and the state of that inlet with respect to all other outlets. When a pair of set and reset lines are charged, an entire row of cross points (determined by the activated select line) are read out on the 32 set and reset lines (a pair for each of the 32 inlets). To determine which latches are on and which are off, it is only necessary to monitor either the set or the reset lines. In an embodiment which has been constructed, the set lines are monitored. If the set lines are minus, the 32 cross points in that row are on, if plus they are off. The 32 set lines are divided into two groups, the first group is the single cross point addressed by the read status command, the other group includes all of the other set lines in that row or'ed together. The result of the read status command thus is a pair of bits, the first, "XY busy", indicates whether or not a connection exists between the inlet X and outlet Y, the other bit, "X busy", indicates whether or not at least one connection exists between the inlet X and one or more outlet other than the outlet Y. In an embodiment which has been constructed the arrays were constructed in a double metal level technology to improve the bandwidth characteristic. Since the cross point device and inlet and outlet conductors are unclocked, the connection, when made is transparent. In the mentioned embodiment the bandwidth is 20–30 megabits/sec. depending on outlet loading.

The control inlet (CI) can be connected to any outlet 0-1 through 0-32, similarly the control outlet (CO) can be connected to any of the inlets I-1 through I-32. The call rearranging input (CRI) can be connected to any of the outlets 0-1 through 0-32 or the call rearranging outlet (CRO) can be connected to any of the inlets I-1 through I-32. The call rearranging inlets and outlets are used to establish alternate, parallel temporary paths for purposes of call rearrangement, as is more fully described in the referred to copending Melas application. The control inlets and outlets are used to either connect any of the inlets I-1 through I-32 directly to the network control 10, or to connect any of the outlets 0-1 through 0-32 to the network control 10.

Figure 5:
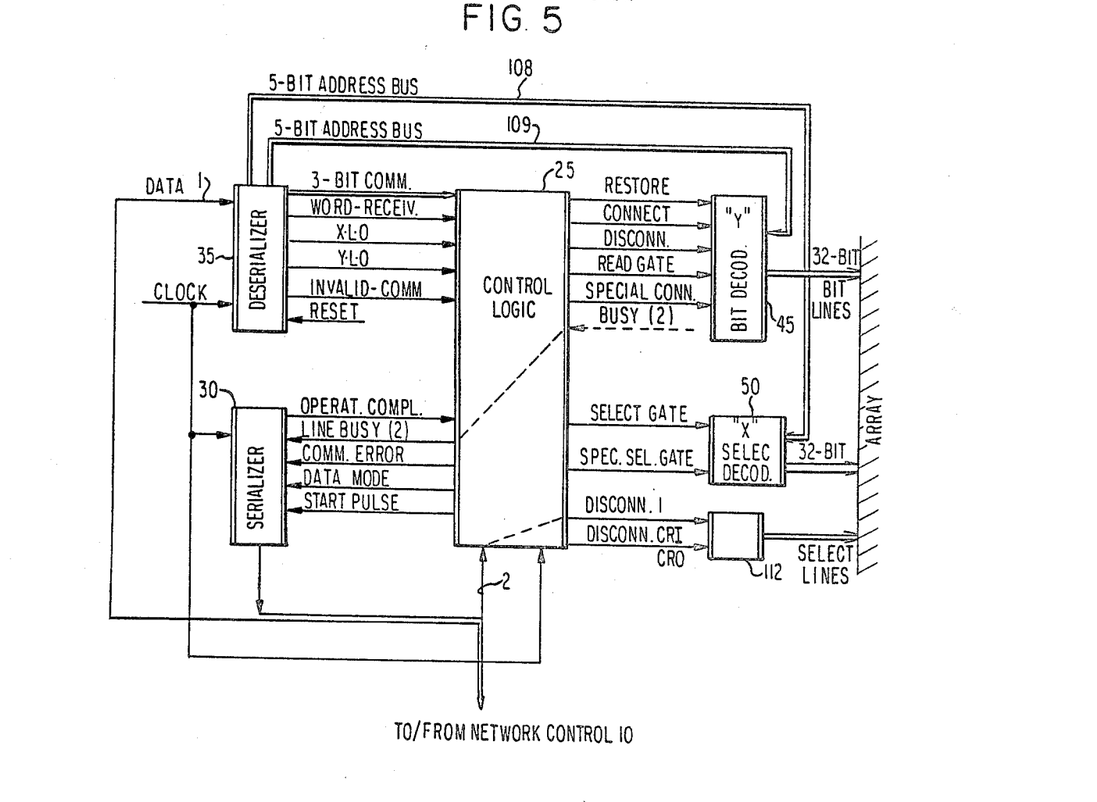
FIG. 5 is a block diagram of the array processor in the intelligent cross point array.

A functional block diagram of the array processor 15 is shown in FIG. 5; where reference characters common to FIG. 2 refer to identical apparatus including for example a deserializer 35, the serializer 30, the control logic 25, the decoders 45 and 50.

Aside from the control conductors 1 and 2, connecting the network control 10 to each of the array processors 15, a clocking signal is provided to each of the array processors. Control line 1 provides an input to the deserializer 35, and the output of the serializer 30 is coupled to the same conductor; accordingly, depending on the functions being carried out by the array processor 15, conductor 1 may carry information in both directions. The other conductor, conductor 2 is a unidirectional conductor and it is connected directly to the control unit 25.

The deserializer 35, in response to receipt of sequential signals on the control conductor 1, provides a parallel output, after validation of a command which includes a three bit command portion input to the control unit 25, a five bit Y address coupled over bus 109 to the decoder 45 and a five bit X address coupled over bus 108 to the decoder 50. In addition, the deserializer 35 times the incoming signals so that when the last pulse time is initiated, and assuming a parity error is not detected, then the word receive signal is coupled to the control logic 25. In the event a parity error is detected, an invalid command signal is coupled to the control logic 25. The other outputs of the deserializer 35, namely the three bit command or operation code and the two five bit addresses are valid until the deserializer 35 is reset by the control logic 25. The network control 10 command to the array processor 15, in an embodiment of the invention which has actually been constructed, is 21 bits long including a three bit start sequence, a three bit operation code, a five bit outlet or Y address, a five bit inlet or X address, a parity bit, a two bit stop sequence and two bits which are presently unused.

Receipt of the word received signal at the control logic 25 initiates an internal clock which is used to gate out a variety of control signals based on the status of the three bit operation code. Regardless of whether or not the function being performed is a connection (or setting a latch), disconnection (or resetting a latch), or a read operation, the initial operation is identical. In particular, the X and Y addresses in the command signal are decoded, and accordingly the five bit Y addresses causes a selection to be made of 1 of 32 possible columns in the array. After a fixed delay, the restore pulse (one of the outputs of the control logic 25) is used to charge the set and reset line pair. Following that operation, for a normal connection, disconnection or read operation, one of the three signals connect, disconnect or the read gate is supplied to the decoder 45 from the control logic 25. In the case of the connect signal, the set line of the selected set/reset pair is discharged. At this time, the select gate (originated at the control logic 25) and steered via the decoder 50 to the appropriate rod, conditions the latch in the connect mode.

The disconnect is similar except that the disconnect signal is generated rather than the connect signal, this causes the discharge of the reset line of the selected set/reset pair so that when the select gate is provided, the latch is reset.

In the case of the read operation, there is no connect or disconnect pulse, the restore pulse charges the set/reset pair selected by the Y decoder, and both are charged when the select line is activated. As a result, none of the latches changes state. However, there are a pair of dot OR circuits for every column which receive as inputs selected combinations of the signals on the set/reset pair of all latches in that row. The gating is arranged so that one of the dot OR circuits indicates the state of the selected cell, i.e. its only effective input is that selected by the XY addressing. The other dot OR circuit receives inputs from every other latch in the same row.

The output of each dot OR circuit is coupled to an associated bistable, so that if the first bistable circuit is set it indicates that the addressed latch had been set. If the other bistable circuit is set, it indicates that a latch other than the addressed latch in the addressed row had been set. These bistable circuits provide two bits which are used in the response delivered for a read command. The indication in FIG. 5 of busy (2) is the two bits derived from these two bistable circuits which is coupled back through the control logic 25 to the serializer 30 to provide the desired response.

At this time an alternative to the use of external CR bus switching can now be explained. As shown in FIG. 3 the array has a single CRI and CRO. If we provide for two CRI's and two CRO's, each coupled to a dedicated cell then we can use the array switch to select not only a CR inlet or outlet, but it can also select which CR bus to use.

The foregoing discussion provides for three of the eight commands which the array processor is capable of performing. Two others relate to the control input or call rearranging input connection or disconnection.

For connection of an inlet to the control, an outlet to the control, or an inlet to the call rearranging outlet or an outlet to the call rearranging inlet, a different command is used which, via the control logic 25 generates a special connect rather than connect; and similarly, rather than generating a select gate, a special select gate is generated. Disconnect operations can be similar wherein the control logic 25 generates disconnect for call rearranging rather than the simple disconnect, as shown in FIG. 5. In an embodiment which has been constructed, addressing is not required for disconnecting a call rearranging connection or a control connection and thus a select or special select gate is not required. The command to connect an inlet to CRO or to CO is identical, the low order Y bit (Y.L.O) determines whether the connection is to CRO or CO. Similarly the command to connect CRI or CI to an outlet is also identical, in this case the lower order X bit (X.L.O) determines the connection. Any disconnection of CRI or CRO, is effected with a single command decoded in decoder 112. Disconnection of the control line (CI or CO) is again a single command but it is received via control 2 and is a single pulse as opposed to all other commands which are received via control 1 and comprise a sequence of pulses.

Under certain circumstances, the control unit 25 formulates a reply to a command message. The reply is useful at the network control 10 for transferring information identifying the status of a particular cross point latch, or for ensuring synchronization in operation, particularly when the control conductor 1 is connected to an inlet or outlet, for under those circumstances a pulse on conductor 2 is necessary to restore normal mode of operation. Thus the reply message has a format including one or more bits to indicate the read status, and one (or more) bit(s) to indicate normal mode (wherein control signals are carried by the control conductor 1) or a data mode status wherein the control conductor 1 is used to transfer data, i.e. it is connected either to an inlet or an outlet. In an embodiment of the invention which has been constructed, the response consisted of 13 bits, a three bit start sequence, a XY busy bit indicating the status of an addressed cross point, an X busy bit indicating the status of every other cross point device in the addressed row, a data mode bit indicating whether or not the array processor 15 is operating in the normal or data mode, a command error bit indicating whether or not a parity error was detected in the last received command, a parity bit, a two bit stop sequence; three bits are presently unused. While in the embodiment actually constructed the response is generated for every command, it should be understood that is not essential. For example, a response only to a read command is sufficient for some purposes.

The embodiment we constructed was used to connect terminals to controller ports in a computer system. The port-terminal connection is, in general, bidirectional while the network supplies unidirectional paths between inlet and outlet. Accordingly, the terminal and port each appeared twice in the network. That is, the terminal and port were both connected to inlet and outlets so that two paths through the network were supplied, one for port to terminal data flow and the other for terminal to port data flow.

The control logic includes a data mode latch which is set in response to receipt of a command to connect the control conductor 1 to either an inlet or an outlet. The state of this latch supplies the data mode bit referred to above in the response. The bistable circuits generating the XY busy and X busy bits have already been referred to. The command error bit is generated by another latch which is set by the invalid command signal provided by the deserializer 35. The drawings indicate that control 1 is bidirectional, carrying comamnds from network control 10 and responses to network control 10. Since these are time separated this approach is feasible. An embodiment which has been constructed used three unidirectional conductors between network control 10 and each array processor 15, one for commands from network control 10, one to network control 10 and one for the CI or CO disconnect. The particular command coding of course dictates the control logic of the control unit. Inasmuch as those skilled in the art can, after a review of the description, design many such suitable control units and since the particular command coding employed in an embodiment of the invention which has been constructed is not essential to the invention, we do not believe that any further description of the control unit is required.

Having thus described our invention, what we claim as new, and desire to secure by Letters Patent is:

1. A switching network comprising:
   a plurality of intelligent crosspoint arrays, each with plural input and plural output conductors, for selectively connecting input and output lines in response to externally generated commands;
   network control means for generating said external commands and for monitoring the status of said arrays; and
   coupling means for coupling said network control means to sid intelligent arrays, said coupling means including one multi-mode conductor and one single mode conductor for each said arrays, said multi-mode conductor being operable to transmit bidirectional sequential signals representative of a command and/or a response and said single mode conductor being operable to transmit unidirectional signal for changing the mode of operation of said multimode conductor.

2. The switching network of claim 1 wherein the coupling means includes two conductors and one single mode conductor for each said arrays with one of the conductors being operable to transmit unidirectional sequential signals representative of a command, another of said conductors being operable to transmit unidirectional sequential signals representative of a response and the single mode conductor for transmitting a unidirectional signal for changing the command established by said one conductor.

3. A switching network comprising:
a plurality of intelligent crosspoint arrays, each with a first set of plural input and plural output conductors, for selectively connecting input and output lines in response to externally generated commands; said intelligent crosspoint arrays including a plurality of controlled switches for coupling each of said input lines to each of said output lines,
a plurality of switch controllers, one for each of said switches,
switch control means for selectively controlling each of said switch controllers in response to said externally generated commands, said switch control means including first means for responding to sequential signals on a one of said conductors to control said plurality of switch controllers,
second means to selectively connect said one of said second set of conductors to one of said inlets or outlets in response to one of a selected set of sequential signals on said one of said second set of conductors,
third means responsive to a signal on another of said conductors for breaking a connection previously established by said second means;
network control means for generating said external commands and for monitoring the status of said arrays; and
coupling means including the second set of conductors for coupling said network control means to said intelligent arrays, said coupling means consisting of no more than three conductors for each of said arrays for the transfer of commands and status between said arrays and said network control means.

4. The apparatus of claim 3 in which said second means includes means to disable said first means for as long as said one of said conductors is connected to one of said inlets or outlets.

5. The apparatus of claim 3 in which said switch control means includes:
fourth means responsive to sequential signals on one said conductor to sense status of any of said switches, and including message generating means to assemble and transmit on one of said conductors sequential signals reflecting said status.

6. The network of claim 2 in which said cross point arrays are arranged in three stages, with a plurality of arrays in each of primary, intermediate and tertiary stages, and in which at least arrays in said primary and tertiary stages include:
at least a call rearranging input conductor and a call rearranging output conductor, a plurality of call rearranging switching means for selectively connecting outlets of tertiary stages to said call rearranging input conductor and for selectively connecting inlets of primary stages to said call rearranging output conductor, and at least one call rearranging bus connecting primary stage call rearranging output conductors to tertiary stage call rearranging inlet conductors whereby:
an alternate parallel path can be established for a selected connection via said call rearranging switching means, said call rearranging input and output conductors and said call rearranging bus.

7. A switching network for selectively connecting any of a plurality of up to N input lines to any of a plurality of up to N output lines comprising:
network control means for generating array command signals,
a plurality of n×n intelligent crosspoint arrays with each of said intelligent crosspoint arrays including:
a plurality of controlled switches coupling each of said input lines to each of said output lines,
a plurality of switch controllers, one for each of said switches,
control means for selectively controlling each of said switch controllers in response to the array command signals, said control means including first means for responding to sequential signals on a one of a pair of conductors to control said plurality of switch controllers,
second means to selectively connect said one of said conductors to one of said inlets or outlets in response to one of a selected set of sequential signals on said one of said conductors,
third means responsive to a signal on the other of said pair of conductors for breaking a connection previously established by said second means,
a first group of A arrays connected to said N input lines, where A=N/n, a second group of A arrays with inputs connected to outputs of said first group, a third group of A arrays with inputs connected to outputs of said second group of arrays and outputs connected to said N output lines, and
means including the conductors connecting said network control means to each of said arrays.

8. The apparatus of claim 7 in which said second means includes means to disable said first means for as long as said one of said conductors is connected to one of said inlets or outlets.

9. The apparatus of claim 7 in which said control means further includes:
fourth means responsive to sequential signals on one of said conductors to sense status of any of said switches, and including message generating means to assemble and transmit on one of said conductors, sequential signals reflecting said status.

* * * * *